(12) United States Patent
Yahaya et al.

(10) Patent No.: US 11,642,629 B2
(45) Date of Patent: May 9, 2023

(54) MULTI-LAYER COMPOSITE GAS SEPARATION MEMBRANES, METHODS FOR PREPARATION, AND USE

(71) Applicant: SAUDI ARABIAN OIL COMPANY, Dhahran (SA)

(72) Inventors: Garba Oloriegbe Yahaya, Dhahran (SA); Seung-Hak Choi, Dhahran (SA); Ahmad Bahamdan, Dhahran (SA)

(73) Assignee: SAUDI ARABIAN OIL COMPANY

( * ) Notice: Subject to any disclaimer, the term of this patent is extended or adjusted under 35 U.S.C. 154(b) by 470 days.

(21) Appl. No.: 16/825,523

(22) Filed: Mar. 20, 2020

(65) Prior Publication Data

US 2021/0291120 A1 Sep. 23, 2021

(51) Int. Cl.
*B01D 53/22* (2006.01)
*B01D 69/12* (2006.01)
(Continued)

(52) U.S. Cl.
CPC ......... *B01D 69/125* (2013.01); *B01D 53/228* (2013.01); *B01D 67/0006* (2013.01); *B01D 67/0095* (2013.01); *B01D 69/02* (2013.01); *B01D 69/105* (2013.01); *B01D 71/64* (2013.01); *C10L 3/101* (2013.01); *C10L 3/104* (2013.01); *C10L 3/105* (2013.01);
(Continued)

(58) Field of Classification Search
CPC ............... B01D 71/64; B01D 67/0095; B01D 2325/04; B01D 2323/30; B01D 2323/42; B01D 67/0006; B01D 69/125; B01D 53/228; B01D 69/105; B01D 69/02; C10L 2290/548; C10L 3/101; C10L 3/105; C10L 3/104
See application file for complete search history.

(56) References Cited

U.S. PATENT DOCUMENTS 3,980,456 A  9/1976  Browall
4,602,922 A  7/1986  Cabasso et al.
(Continued)

FOREIGN PATENT DOCUMENTS

EP  0719581 A2  7/1996
JP  H0852332 A  2/1996
(Continued)

OTHER PUBLICATIONS

International Search Report and Written Opinion of PCT Application No. PCT/US2021/022673 dated Jun. 7, 2021: pp. 1-12.
(Continued)

*Primary Examiner* — Anthony R Shumate
(74) *Attorney, Agent, or Firm* — Bracewell LLP; Constance Gall Rhebergen

(57) ABSTRACT

Methods and systems for producing and using multi-layer composite co-polyimide membranes, one method for producing including preparing a microporous or mesoporous membrane support material for coating; applying a sealing layer to the membrane support material to prevent intrusion into the membrane support material of co-polyimide polymer; applying a first permselective co-polyimide layer atop and in contact with the sealing layer; and applying a second permselective co-polyimide layer atop and in contact with the first permselective co-polyimide layer.

20 Claims, 3 Drawing Sheets

(51) Int. Cl.
*B01D 67/00* (2006.01)
*B01D 69/02* (2006.01)
*B01D 69/10* (2006.01)
*B01D 71/64* (2006.01)
*C10L 3/10* (2006.01)

(52) U.S. Cl.
CPC ...... *B01D 2323/30* (2013.01); *B01D 2323/42* (2013.01); *B01D 2325/04* (2013.01); *C10L 2290/548* (2013.01)

(56) References Cited

U.S. PATENT DOCUMENTS

| | | | |
|---|---|---|---|
| 4,664,669 A | 5/1987 | Ohyabu et al. | |
| 4,670,146 A | 6/1987 | Inoue et al. | |
| 4,806,189 A | 2/1989 | Kraus et al. | |
| 4,837,054 A | 6/1989 | Schucker | |
| 4,857,080 A | 8/1989 | Baker et al. | |
| 4,871,378 A | 10/1989 | Pinnau | |
| 4,963,165 A | 10/1990 | Blume et al. | |
| 5,049,167 A | 9/1991 | Castro et al. | |
| 5,213,689 A | 5/1993 | Kafchinski et al. | |
| 5,286,280 A | 2/1994 | Chiou | |
| 5,324,430 A | 6/1994 | Chung et al. | |
| 5,356,461 A | 10/1994 | Sluma et al. | |
| 5,547,551 A | 8/1996 | Zuckerbrod et al. | |
| 5,558,698 A | 9/1996 | Baker et al. | |
| 5,702,503 A | 12/1997 | Tse | |
| 8,614,288 B2 | 12/2013 | Liu et al. | |
| 8,704,030 B2 | 4/2014 | Liu et al. | |
| 8,772,380 B2 * | 7/2014 | Vaidya | C08L 95/00 524/68 |
| 8,921,473 B1 * | 12/2014 | Hyman | C08K 3/04 524/495 |
| 9,962,646 B2 | 5/2018 | Yahaya et al. | |
| 10,029,207 B2 | 7/2018 | Qiao et al. | |
| 11,007,491 B2 * | 5/2021 | Yahaya | C08G 73/1067 |
| 11,007,492 B2 * | 5/2021 | Yahaya | C10L 3/101 |
| 11,279,864 B2 * | 3/2022 | Patel | C04B 24/383 |
| 2012/0080147 A1 | 4/2012 | Offeman et al. | |
| 2018/0178169 A1 | 6/2018 | Yoneyama et al. | |
| 2018/0345229 A1 | 12/2018 | Yahaya et al. | |
| 2020/0277664 A1 * | 9/2020 | Frenz | C12N 15/1065 |
| 2020/0354220 A1 * | 11/2020 | Pedersen | C04B 35/5626 |
| 2021/0189342 A1 * | 6/2021 | Novobrantseva | G01N 33/5011 |
| 2021/0285036 A1 * | 9/2021 | Yin | C12Q 1/6837 |
| 2021/0317461 A1 * | 10/2021 | Novobrantseva | A61K 31/713 |
| 2022/0010367 A1 * | 1/2022 | Ramachandran Iyer et al. | G01N 33/5308 |
| 2022/0017951 A1 * | 1/2022 | Ramachandran Iyer | C12Q 1/6841 |
| 2022/0049293 A1 * | 2/2022 | Frenz | C12Q 1/6876 |

FOREIGN PATENT DOCUMENTS

| | | |
|---|---|---|
| WO | 2015029884 A1 | 3/2015 |
| WO | 2017120195 A1 | 7/2017 |

OTHER PUBLICATIONS

Dai et al., "Recent advances in multi-layer composite polymeric membranes for CO2 separation: A review", Science Direct, Green Energy & Environment, vol. 1, pp. 102-128, 2016.

Kim et al., "CO2 separation performances of composite membranes of 6FDA-based polyimides with a polar group", Journal of Membrane Science, 211, pp. 41-49, 2003.

* cited by examiner

MULTI-LAYER COMPOSITE GAS SEPARATION MEMBRANES, METHODS FOR PREPARATION, AND USE

BACKGROUND

Field

Embodiments of the disclosure relate to membranes and separations for hydrocarbons. In particular, embodiments of the disclosure show multi-layer composite co-polyimide membranes for sour gas separations relating to natural gas and associated processes for their production.

Description of the Related Art

In recent years, certain interest in clean energy has increased, and world-wide demand for clean-burning natural gas is also rising. Natural gas consumption is likely to grow at a compounded annual growth rate of about 2.7% from about 2,600 Billion Cubic Meters (BCM) in 2005 to around 3,900 BCM in 2020. Based on 2006 estimates, natural gas has a reserve-to-production ratio of 61 years and a resource-to-production ratio of 133 years.

Raw natural gas varies greatly in composition depending on its extraction origin. Although methane constitutes a key component of raw natural gas, it may also contain considerable amounts of impurities including water, hydrogen sulfide ($H_2S$), carbon dioxide, nitrogen and other hydrocarbons. Natural gas (methane) is a main feedstock for the chemical industry, and with the potential growth in demand for natural gas, separation technologies with high efficiency are required in order to be able to exploit gas fields which are not yet commercially viable because of high contaminant contents.

Most of the gas reserves around the world are of low-quality with high contents of impurities, which include acid gas (carbon dioxide ($CO_2$) and hydrogen sulfide ($H_2S$)), water, heavy hydrocarbons ($C_3+$ molecules) and other contaminants such as nitrogen and mercaptans. For natural gas to meet sales gas specifications, these contaminants, especially acid gas, which constitutes the largest amount of impurity in many existing natural gas reserves, need to be removed. One requirement for natural gas sweetening processes involve the separation of acid gases from natural gas, and this treatment is important in order to prevent corrosion of transportation pipelines, reduce atmospheric pollution, and avoid other detrimental effects.

In some systems, the removal of acid gases occurs before the gas is delivered to pipelines or stored in portable cylinders as compressed natural gas. At high concentrations, acid gases can corrode transportation pipelines and have numerous other detrimental effects. Moreover, $H_2S$ is toxic and its combustion produces harmful $SO_2$ gas. Thus, sweetening of natural gas (removal of contaminants, such as for example $H_2S$) is needed to reduce pipeline corrosion, prevent atmospheric pollution, increase fuel heating value of natural gas, and decrease the volume of gas to be transported in pipelines and cylinders.

Presently, natural gas treatment and upgrading incorporates industrial gas separation processes. Examples of natural gas treatment technology that have been widely applied include absorption and adsorption of acid gases, such as for example through amine absorption processes and pressure swing adsorption (PSA), respectively. However, conventional technologies are associated with several problems, which include high energy requirements and high capital costs.

Absorption of acid gases in basic solvents, such as liquid amines and hot aqueous potassium carbonate solutions, and pressure swing adsorption (PSA) are examples of natural gas purification alternative technologies that are commercially available. However, a number of drawbacks to these processes exist as they rely upon energy-intensive thermal regeneration steps, large footprints, heavy maintenance requirements, and high capital costs.

The development of membrane materials for sour acid gas separations rarely has been studied. Studies that have been reported include studies on $H_2S/CH_4$ separation performance using rubbery polymeric membranes. However, since rubbery polymeric materials separate based on solubility selectivity, the $CO_2/CH_4$ separation capability of the rubbery polymeric membranes declines sharply and is much lower than other glassy polymers such as cellulose acetate (CA). Furthermore, the mechanical stability of rubbery polymers tends to fall to significantly less than that of glassy polymeric materials. Certain existing membranes require stringent pretreatment for water and heavy hydrocarbons content, as the membranes are very susceptible to swelling and plasticization in the presence of heavy hydrocarbons; benzene, toluene, and xylene (BTX); water; and other condensable gases.

Glassy polyimide is one type of polymeric membrane that has been investigated for acid gas separations from natural gas. These high glass transition temperature (Tg) (Tg>about 300° C.) materials develop certain acid gas separation capability based on size selectivity. Natural gas is usually treated at high pressures (up to and more than about 900 psi) and is typically saturated with heavy hydrocarbons ($C_{3+}$) and water vapor. Inadequate performance of current existing polymeric membranes impedes the full utilization of separation membranes on the industrial scale. Some of the challenges include inability to achieve both high permeability and selectivity, selectivity-permeability trade-off, membrane plasticization, and physical aging. These issues inhibit long-term gas separation performance and membrane stability. Thus, polymeric membrane materials with high permeation properties (i.e., both high permeability and selectivity) are necessary for the viability of membrane-based natural gas separations and membrane-absorption hybrid processes.

A variety of processes and techniques have been developed to separate and recover helium from multicomponent gas streams. Such processes include stand-alone membrane units, stand-alone cryogenic units and combinations of membrane units, cryogenic units and pressure swing adsorption (PSA) units. Stand-alone cryogenic processes have been used to produce crude helium at high recovery rates from natural gas or other streams containing low purity helium. When the concentration of helium in the feed drops to low levels; e.g., below about 1 mol. %, processes using stand-alone cryogenic units becomes inefficient and impractical. Helium is typically present in natural gas at below about 0.5 mol. % levels and is mostly extracted as crude helium across liquid natural gas (LNG) trains. World demand for helium is increasing, and this is expected to put pressure on production facilities as demand for high-purity helium products begins to outstrip supply. In light of these trends, processing methods that overcome the inefficient cryogenic process (especially at below 0.5 mol. % He in natural gas) are needed.

In the past few decades, gas separation membranes have found applications in several gas separation processes including carbon capture, natural gas sweetening, and upgrading. This is due in part to membranes being energy efficient, having a small footprint, being flexible in operation, and being less costly than the traditional techniques, which include amine absorption, pressure swing adsorption (PSA), and cryogenic distillation.

As noted, the consumption of natural gas is rapidly increasing worldwide, as it is becoming one of the largest fuel sources after coal. However, many of the world's gas reserves contain high levels of natural gas contaminants, which include of $CO_2$; $H_2S$; $N_2$, and others in varying amounts (up to 50% v/v in some reserves). These contaminants can cause problems including corrosion of pipelines and other natural gas processing equipment, reduction of heating value and increase in compression and transportation cost if not removed from sales natural gas. In addition $H_2S$ is extremely toxic and its combustion produces harmful $SO_2$, and thus it must be removed from natural gas sales streams in order to meet sales gas specifications.

Existing membrane performances are inadequate for large industrial-scale applications. Achieving both high permeability and high selectivity without membrane aging and plasticization of a given membrane are challenges to be addressed. For instance, plasticization significantly degrades permeation properties of membranes at high pressures and in the presence of other contaminants such as BTX, heavy hydrocarbons, and water, and membrane physical aging reduces membrane permeabilities significantly over the average 2-5-year life of a membrane.

These are impediments to long-term stability and membrane performance. High membrane performance is necessary to compete with conventional separation methods that include PSA, amine absorption processes, cryogenic distillation etc.

Despite the fact that 6FDA-based polyimides show high performance for several gas pairs and have exhibited potential opportunities for further research, they are far from being applied on an industrial scale. In general, a vast majority of data obtained from previous studies were from pure gas tested on dense membranes with a membrane thickness of up to 150 µm or more. However, existing data do not represent industrial value data. This is due to transport behavior of thin film composite (TFC) membranes, with a thin selective layer of about 0.2-1.0 µm thickness, being different from those of dense membranes. This may be attributed, in part, to different polymer chain arrangements in TFC and dense films, which then result in different permeation properties and separation performances.

Fabrication of expensive 6FDA-based polyimide as solely an integral asymmetric hollow fiber membrane is a challenge being encountered in many recent studies. Another challenge is the fabrication of a defect-free ultrathin multi-layer membrane with 6FDA-based polyimide as a selective layer, without losing separation performance for industrial scale separation processes. Even though hollow fibers have benefits, such as higher packing density, easier scaling, etc., when compared to self-supporting dense film flat-sheets, only limited data have been reported on the fabrication of 6FDA-based polyimide thin-film composite hollow fiber membranes.

Moreover, about 50 $g/m^2$ of polymer is required for the fabrication of hollow fiber membranes using phase inversion techniques. Thus, economic viability may not be possible using this method to fabricate membranes from very expensive polymers. However, thin film composite membranes have certain advantages when compared to asymmetric hollow fiber membranes. Fabrication of TFC requires less material processing, and a much smaller amount (0.1-2 $g/m^2$) is required to be deposited on the substrate of a composite membrane, thus costly materials with very high performance can be used.

In order to enhance and optimize polyimide materials for gas separation membranes, further improvement of their properties and associated film production is required, and this can be achieved by chemical modification and processing of the polymers.

SUMMARY

Applicant has recognized that there is a need for efficient membrane separation apparatus, methods, and systems for selectively separating sour gas, and other undesirable components, from sour natural gas feeds. The disclosure presents apparatus, methods, and systems for producing and applying suitably selective and permeable ("permselective") multi-layer co-polyimide composite membranes, which show efficient, surprising, and unexpected separations of undesirable components from a sour natural gas feed. Unlike conventional technologies, membrane-based separations of the present disclosure do not exhibit drawbacks of conventional technology, as they are much more energy efficient, have less footprint, and are flexible in operation. Separation of helium from natural gas using high-performance membranes or combinations of membranes with any of the other processes described previously that achieve a satisfactorily high helium recovery can improve the efficiency of the separation processes.

Limited data have been reported on the development of membrane materials for aggressive sour gas separations. Embodiments of natural gas membrane separations of the present disclosure show surprising and unexpected advantages over commercially-available membranes, as aromatic block co-polyimides disclosed here provide superior efficiency, productivity, and resistance to penetrant-induced plasticization compared to cellulose acetate (CA), which is presently the industrial standard membrane material for $CO_2$ separations. Embodiments disclosed here show polyimide membrane gas separation applications suitable for acid or sour gas feed separations and helium recovery from especially sub-quality natural gas using aromatic co-polyimide membranes.

The present disclosure relates to methods and systems for fabricating defect-free multi-layer composite co-polyimide membranes and their use, particularly for gas and vapor separations. Consecutive coating process (described further with regard to FIG. 1) can include: (a) pre-wetting of a substrate using pure solvent, which is also used for preparation of a polymer solution in one or more later step (selective layers coating); (b) deposition of a first permselective layer; (c) coating of second permselective layer on top of first permselective layer coated surface; and (d) immersion of the composite membrane formed from stages (a) to (c) in a cross-linking agent solution. In some embodiments, steps (a) to (c) are required and step (d) for cross-linking is optional. In some other embodiments, an optional gutter layer is applied, for example after the pre-wetting pure solvent.

By applying the methods and systems, one or more selective layers can be fabricated on top of a porous substrate (for example, a flat sheet or hollow fiber) with precisely controlled membrane thickness. Importantly, embodiments of the disclosure prevent intrusion of co-polyimide solution into the pores of a substrate, which prevents dramatic decreases in selectivity and permeance.

Embodiments of multi-layer composite co-polyimide membranes of the present disclosure can include those co-polyimides described, for example, in U.S. Pat. No. 9,962,646, U.S. Pub. No. 2018-0345229 A1, U.S. application Ser. No. 16/287,467, and U.S. application Ser. No. 16/287,474, the disclosures of which are all incorporated here by reference in their entirety.

Aromatic co-polyimide membranes of the present disclosure can be synthesized from a wide range of monomers including and not limited to 4,4'-(hexafluoroisopropylidene) diphthalic dianhydride, also known as 2,2'-bis(3,4-dicarboxyphenyl)hexafluoropropane dianhydride (6FDA); 9,9-bis(4-aminophenyl) fluorene (CARDO); and 2,3,5,6-tetramethyl-1,4-phenylenediamine (durene diamine). The polymerization of the aforementioned monomers can form random polymers and block co-polymers, for example with different block lengths and block ratios of (6FDA-durene)/(6FDA-CARDO) co-polyimides. To enhance separation performance and optimize co-polyimides for gas separation, chemical modifications including substitution of other pertinent moieties and bulky functional groups in the co-polyimides backbone can be carried out.

Some embodiments of the present disclosure use monomers such as 1,3-phenylenediamine, also known as mPDA. Some embodiments of the present disclosure use monomers such as 2,3,5,6-tetramethyl-1,4-phenylenediamine, also known as durene diamine. Such exemplary monomers are used in combination to form different block lengths of (6FDA-mPDA)/(6FDA-durene) block co-polyimides. In addition, development of aromatic block co-polyimides of the present disclosure can be carried out using other monomers including: 3,4,9,10-Perylentetracarbonsaurediahydrid, also known as PTCDA; Pyromellitic dianhydride, also known as PMDA; 1,4-bis(4-aminophenoxy)triptycene, also known as BAPT; 4,5,6,7-Tetrabromo-2-azabenzimidazole, also known as TBB; 4,4'-(9-Fluorenylidene)dianiline, also known as FDA; and 4,4'-Oxydiphthalic anhydride, also known as ODA.

Such example monomers can form example block units and block co-polymers including for example: (6FDA-PTCDA-FDA); (6FDA-TBB-FDA); (6FDA-BAPT-FDA); (PTCDA-FDA)/(PMDA-mPDA); (PMDA-FDA)/(PTCDA-mPDA); (ODA-FDA)/(PTCDA-mPDA); (6FDA-BAPT)/(6FDA-FDA); (PTCDA-mPDA)/(6FDA-FDA); (PTCDA-FDA)/(ODA-mPDA); (PTCDA-FDA)/(6FDA-FDA); (6FDA-TBB)/(6FDA-FDA); (6FDA-TBB)/(6FDA-durene); (6FDA-mPDA)/(6FDA-BAPT); (PTCDA-mPDA)/(6FDA-FDA); (6FDA-mPDA-BAPT); and (6FDA-FDA-mPDA).

Unique modification steps significantly improve the performance of the co-polyimides. In some other embodiments, the development of aromatic co-polyimides can also be considered from other monomers with and without, or in the absence of, crosslinking. Example monomers include 4,4'-methylene-bis(2,6-diethylaniline) (MDEA); 9,9-bis(4-aminophenyl-3-isopropyl-5-methylphenyl) fluorene (alkyl substituted CARDO); 4,4'-Diaminodiphenylmethane (MDA); 2,2'-Bis(trifluoromethyl)benzidine (TFMB); 4,4'-Diaminooctafluorobiphenyl; 4,4'-Diaminobiphenyl; 2,3,5,6-Tetrafluoro-1,4-phenylenediamine; and combinations thereof. Those of ordinary skill in the art will realize additional monomers could be used in embodiments of the disclosure.

Examples include forming such co-polymers as 6FDA-durene/CARDO (3:1) (millimoles durene:millimoles CARDO); 6FDA-durene/CARDO (1:1); 6FDA-durene/CARDO (1:3); block (6FDA-durene)/(6FDA-CARDO) (1,000-20,000)/(1,000-20,000); 6FDA-durene/alkyl substituted CARDO (3:1); 6FDA-durene/alkyl substituted CARDO (1:1); 6FDA-durene/alkyl substituted CARDO (1:3); block (6FDA-durene)/(6FDA-alkyl substituent CARDO) (1,000-20,000)/(1,000-20,000); 6FDA-durene/MDEA (3:1); 6FDA-durene/MDEA (1:1); 6FDA-durene/MDEA (1:3); block (6FDA-durene)/(6FDA-MDEA) (1,000-20,000)/(1,000-20,000); and combinations thereof.

Crosslinking of the polymers can be achieved using different types and sizing of functional groups. Examples include and are not limited to functionalization or grafting with polar or $H_2S$-philic, in addition to or alternative to $CO_2$-philic, groups that include Bromine (Br); sulfonic acid ($SO_3H$); diallyl amine; acrylonitrile; jeffamines; and combinations thereof. Crosslinking can also be achieved using such cross-linkers as N,N-dimethylpiperizine, p-xylenediamine, m-xylenediamine, aliphatic diamine, polyethyleneimine, 1,3-cyclohexane-bis(methylamine), and combinations thereof, for example.

In some embodiments, at least three distinct moieties are polymerized together, the moieties including a 2,2'-bis(3,4-dicarboxyphenyl)hexafluoropropane dianhydride (6FDA) based moiety; a 4,4'-(hexafluoroisopropylidene)dianiline (6FpDA) based moiety; and at least one component selected from the group consisting of: a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

Aromatic random and block co-polyimide membranes of the present disclosure can be developed from wide range of monomers including 4,4'-(hexafluoroisopropylidene) diphthalic dianhydride, also known as 2,2-bis(3,4-dicarboxyphenyl)-1,1,1,3,3,3-hexafluoropropane dianhydride (6FDA); benzophenone-3,3', 4,4'-tetracarboxylic dianhydride (BTDA); pyromellitic dianhydride (PMDA); 9,9-bis(4-aminophenyl)fluorene (CARDO); 4,4'-(hexafluoroisopropylidene)dianiline (6FpDA); 2,2'-bis(trifluoromethyl)benzidine (ABL-21); and 2,4,6-trimethyl-m-phenylenediamine (DAM) for forming random and different block length block polymers of, for example, 6FDA-DAM/CARDO; 6FDA-DAM/6FpDA; and 6FDA-DAM/ABL-21 co-polyimides.

In addition, the development of these aromatic co-polyimides can also be considered from other monomers that include 3,3'-dihydroxybenzidine, 3,3-(hexafluoroisopropylidene) dianiline, and other bulky diamines, forming such example copolymers as 6FDA-DAM/CARDO (3:1); 6FDA-DAM/CARDO (1:1); 6FDA-DAM/CARDO (1:3); (6FDA-DAM)/(6FDA-CARDO) (1,000-20,000)/(1,000-20,000); 6FDA-DAM/6FpDA (3:1); 6FDA-DAM/6FpDA (1:1); 6FDA-DAM/6FpDA (1:3); (6FDA-DAM)/(6FDA-6FpDA) (1,000-20,000)/(1,000-20,000); 6FDA-DAM/ABL-21 (3:1); 6FDA-DAM/ABL-21 (1:1); 6FDA-DAM/ABL-21 (1:3); (6FDA-DAM)/(6FDA-ABL-21) (1,000-20,000)/(1,000-20,000); (6FDA-DAM)/(6FDA-CARDO)/(6FDA-6FpDA); (6FDA-DAM)/(6FDA-ABL-21)/(6FDA-CARDO); (6FDA-ABL-21)/(6FDA-CARDO)/(6FDA-6FpDA); and combination thereof.

In some embodiments, a membrane layer includes at least three distinct moieties polymerized together, the moieties including a dianhydride selected from the group consisting of: a 2,2'-bis(3,4-dicarboxyphenyl)hexafluoropropane dianhydride (6FDA) based moiety; a benzophenone-3,3', 4,4'-tetracarboxylic dianhydride (BTDA) based moiety; and a pyromellitic dianhydride (PMDA) based moiety; a 2,4,6-trimethyl-m-phenylenediamine (DAM) based moiety; and at least one component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

Among polymers for gas separation membranes, aromatic polyimides are advantageous due to high thermal stability, chemical resistance, mechanical strength, and a low dielectric constant. These polymer properties enable membrane structures made from polyimides to withstand deterioration due to "wet" conditions often found with natural gas streams. This is evident from results obtained and shown here, as co-polyimide composites exhibit $CO_2/CH_4$ and $H_2S/CH_4$ selectivities of 10 and 20 respectively; while $CO_2$ and $H_2S$ permeabilities are 78 and 149 Gas Permeation Units (GPU). This performance is significantly greater than those obtained in certain current commercial membranes. Moreover, the $CO_2/CH_4$ and $H_2S/CH_4$ selectivities of the composite membranes do not degrade to anywhere near the same extent as was reported for CA and other commercial membranes, even under more aggressive environments here. Stability at high pressures and high $H_2S$ concentration is impressive and unique, as well as surprising and unexpected.

Embodiments of multi-layer composite co-polyimide membranes shown here have high gas fluxes and selectivities, and can be used, for example, to study gas transport properties of pure gases and mixed sour gas streams comprising $H_2S$, $CO_2$, He, $CH_4$, $N_2$ and $C_2H_6$ through thin films of the co-polyimide membranes. Co-polyimide composite membranes exhibit advantageous pure $CO_2$ and He permeances of up to 72 and 58 GPU, respectively. The $CO_2/CH_4$ and $He/CH_4$ ideal selectivities were also enhanced to values of about 34 and 28, respectively. Furthermore, the permeation properties of a simulated sour gas mixture including 10; 55; 10; 3; and 22 vol. % of $CO_2$, $CH_4$, $N_2$, $C_2H_6$ and $H_2S$, respectively, through the membrane were studied at different gas feed pressures of up to 700 psig.

The $CO_2/CH_4$ and $H_2S/CH_4$ selectivities obtained for the membranes are up to 10 and 20, respectively; while $CO_2$ and $H_2S$ permeances are up to 78 and 149 GPU, respectively. These values and separation performance exhibited by the membranes are advantageous being compared to values obtained in certain other high performance polymeric membranes. At high feed pressure (about 700 psig) and up to 22 vol. % $H_2S$ in a feed gas mixture, selectivities and permeances are still advantageous in the membranes. Moreover, the $CO_2/CH_4$ selectivity of the co-polyimides does not degrade to near what was reported for cellulose acetate (CA), even under these much more aggressive environments.

These multi-stage coating and multi-layer composite membranes can be developed using the same polymer with the same or different concentrations in the third and fourth layers. They can also be developed using different polymers with the same or different concentrations in the third and fourth layers. The third and fourth layers of the composite membrane can be developed from the aromatic random and block co-polyimides previously developed and described, for example, in U.S. Pat. No. 9,962,646, U.S. Pub. No. 2018-0345229 A1, U.S. application Ser. No. 16/287,467, and U.S. application Ser. No. 16/287,474, the disclosures of which are incorporated here by reference in their entirety. One of ordinary skill will understand that other co-polyimides can be formed from combinations of the monomers recited in the aforementioned patent and patent applications.

In some embodiments, multi-layer composite co-polyimide membranes of the present disclosure are fabricated in five stages, which include: (a) preparing a pre-wet microporous or mesoporous substrate; (b) applying a gutter layer, where step (b) is optional; (c) applying a permselective layer; (d) applying a top permselective caulking layer; and (e) immersing the composite membrane in a crosslinking agent. Step (e) is also optional. Membranes exhibit advantageous pure and gas mixture permeation properties for gas separations, particularly for sour gas feed separations from natural gas. These performances are unique and among the highest ever reported as they are much higher than those obtained in the industrially used glassy polymers.

As discussed herein, a mesoporous substrate is a material containing pores with diameters between 2 nm and 50 nm. For comparison, microporous substrate is a material having pores smaller than 2 nm in diameter. Other suitable substrates include but are not limited to polyether ether ketone (PEEK), sulfonated polyether ether ketone (SPEEK), polysulfone (PSF), polyether sulfone (PESF), polyvinylidene fluoride (PVDF), polypropylene (PP), poly(tetrafluoroethylene) (PTFE), sulfonated poly(phthalazinone ether sulfone ketone) (SPPESK), poly(phthalazinone ether amide (PPEA), polyether imide (PEI), and polyimide (PI).

Therefore, disclosed here is a method for producing a multi-layer composite co-polyimide membrane, the method including preparing a microporous or mesoporous membrane support material for coating; applying a sealing layer to the membrane support material to prevent intrusion into the membrane support material of co-polyimide polymer; applying a first permselective co-polyimide layer atop and in contact with the sealing layer; and applying a second permselective co-polyimide layer atop and in contact with the first permselective co-polyimide layer.

In some embodiments, the first permselective co-polyimide layer and second permselective co-polyimide layer comprise block co-polymers. In other embodiments, the first permselective co-polyimide layer and second permselective co-polyimide layer comprise the same block co-polymers. Still in other embodiments, the first permselective co-polyimide layer and second permselective co-polyimide layer comprise block (6FDA-CARDO)/(6FDA-durene). In certain embodiments, the first permselective co-polyimide layer and second permselective co-polyimide layer comprise random co-polymers. In some embodiments, the first permselective co-polyimide layer and second permselective co-polyimide layer comprise the same random co-polymers. Still in other embodiments, the first permselective co-polyimide layer and second permselective co-polyimide layer result in a thickness between about 1-3 μm. In some embodiments the first permselective co-polyimide layer comprises block co-polymers and the second permselective co-polyimide layer comprises random co-polymers, or in some embodiments the first permselective co-polyimide layer comprises random co-polymers and the second permselective co-polyimide layer comprises block co-polymers.

Still in other embodiments, the sealing layer comprises a solvent material being the same as a solvent material into which a first co-polyimide of the first permselective co-polyimide layer and into which a second co-polyimide of the second permselective co-polyimide layer are dissolved for the steps of applying the first permselective co-polyimide layer and second permselective co-polyimide layer. Still in certain other embodiments, the sealing layer further comprises a gutter layer. In some embodiments, the gutter layer comprises poly[1-(trimethylsilyl)-1-propyne] (PTMSP).

In yet other embodiments, the microporous or mesoporous membrane support material for coating includes a support material selected from the group consisting of: flat sheet support material; hollow fiber support material; and combinations thereof. Still in other embodiments, the method includes the step of crosslinking the first permselective co-polyimide layer and the second permselective co-polyimide layer. In certain embodiments, the step of applying a sealing layer to the membrane support material includes the use of a component selected from the group consisting of: chloroform (CHCl3); N,N-dimethylformamide (DMF); dichloromethane (DCM); N,N-dimethyl acetamide (DMAc); acetone; tetrahydrofuran (THF); N-methyl-2-pyrrolidone (NMP); tetra chloromethane (CCl4)); and combinations of the same. In some embodiments of the method, a step of drying is carried out after each of the steps of applying a sealing layer, applying a first permselective co-polyimide layer, and applying a second permselective co-polyimide layer.

Some embodiments further include the step of formulating a first co-polyimide for the first permselective co-polyimide layer and formulating a second co-polyimide for the second permselective co-polyimide layer, where the steps of formulating comprise combining more than one monomer in a mixture of monomers, where the more than one monomer is selected from the group consisting of: 2,2'-bis-(3,4-dicarboxyphenyl) hexafluoropropane dianhydride (6FDA); 1,3-phenylenediamine (mPDA); durene diamine; 3,4,9,10-perylentetracarbonsauredianhydrid (PTCDA); pyromellitic dianhydride (PMDA); 1,4-bis(4-aminophenoxy)triptycene (BAPT); 4,5,6,7-Tetrabromo-2-azabenzimidazole (TBB); 4,4'-(9-Fluorenylidene)dianiline (FDA); and 4,4'-Oxydiphthalic anhydride (ODA).

Still in other embodiments, the first permselective co-polyimide layer or second permselective co-polyimide layer comprises a polymer unit selected from the group consisting of: (6FDA-mPDA)/(6FDA-durene); (6FDA-PTCDA-FDA); (6FDA-TBB-FDA); (6FDA-BAPT-FDA); (PTCDA-FDA)/(PMDA-mPDA); (PMDA-FDA)/(PTCDA-mPDA); (ODA-FDA)/(PTCDA-mPDA); (6FDA-BAPT)/(6FDA-FDA); (PTCDA-mPDA)/(6FDA-FDA); (PTCDA-FDA)/(ODA-mPDA); (PTCDA-FDA)/(6FDA-FDA); (6FDA-TBB)/(6FDA-FDA); (6FDA-TBB)/(6FDA-durene); (6FDA-mPDA)/(6FDA-BAPT); (PTCDA-mPDA)/(6FDA-FDA); (6FDA-mPDA-BAPT); and (6FDA-FDA-mPDA).

Some embodiments include the step of formulating a first co-polyimide for the first permselective co-polyimide layer and formulating a second co-polyimide for the second permselective co-polyimide layer, where the steps of formulating comprise combining at least three distinct moieties polymerized together, the moieties including a 2,2'-bis(3,4-dicarboxyphenyl)hexafluoropropane dianhydride (6FDA) based moiety; a 9,9-bis(4-aminophenyl) fluorene (CARDO) based moiety; and 2,3,5,6-tetramethyl-1,4-phenylenediamine (durene diamine) based moiety.

Still other embodiments include the step of formulating a first co-polyimide for the first permselective co-polyimide layer and formulating a second co-polyimide for the second permselective co-polyimide layer, where the steps of formulating comprise combining at least three distinct moieties polymerized together, the moieties including a 2,2'-bis(3,4-dicarboxyphenyl)hexafluoropropane dianhydride (6FDA) based moiety; a 4,4'-(hexafluoroisopropylidene)dianiline (6FpDA) based moiety; and at least one component selected from the group consisting of: a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

Some embodiments include the step of formulating a first co-polyimide for the first permselective co-polyimide layer and formulating a second co-polyimide for the second permselective co-polyimide layer, where the steps of formulating comprise combining at least three distinct moieties polymerized together, the moieties including a 2,2'-bis(3,4-dicarboxyphenyl)hexafluoropropane dianhydride (6FDA) based moiety; a 2,4,6-trimethyl-m-phenylenediamine (DAM) based moiety; and at least one component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

In some embodiments, the first permselective layer or second permselective layer comprises a 2,2'-bis(3,4-dicarboxyphenyl)hexafluoropropane dianhydride (6FDA) based moiety and a 2,2'-bis(trifluoromethyl)benzidine (ABL-21) based moiety.

Still some embodiments include the step of formulating a first co-polyimide for the first permselective co-polyimide layer and formulating a second co-polyimide for the second permselective co-polyimide layer, where the steps of formulating comprise combining at least three distinct moieties polymerized together, the moieties including a dianhydride selected from the group consisting of: a 2,2'-bis(3,4-dicarboxyphenyl)hexafluoropropane dianhydride (6FDA) based moiety; a benzophenone-3,3', 4,4'-tetracarboxylic dianhydride (BTDA) based moiety; and a pyromellitic dianhydride (PMDA) based moiety; a 2,4,6-trimethyl-m-phenylenediamine (DAM) based moiety; and at least one component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

Additionally disclosed are methods of gas separation, the methods including applying the various multi-layer composite co-polyimide membranes to separate at least 2 components of a mixed gas stream. In some embodiments, feed pressure of the mixed gas stream to a feed side of a membrane is up to about 900 psig and $H_2S$ content of the mixed gas stream is up to about 22 volume percent.

Additionally disclosed is a continuous system for producing a multi-layer composite co-polyimide membrane, the system including a first reservoir comprising a sealing material for preparing a microporous or mesoporous membrane support material for coating by applying a sealing layer to the membrane support material; a second reservoir comprising a first co-polyimide solution for applying a first permselective co-polyimide layer to the membrane support material atop and in contact with the sealing layer applied at the first reservoir; and a third reservoir comprising a second co-polyimide solution for applying a second permselective co-polyimide layer to the membrane support material atop and in contact with the first permselective co-polyimide layer; and at least one drying device to dry separate layers applied to the membrane support material.

In some embodiments, the second reservoir and third reservoir comprise block co-polymers. In other embodiments, the second reservoir and third reservoir comprise the same block co-polymers. Still in other embodiments, the second reservoir and third reservoir comprise block (6FDA-CARDO)/(6FDA-durene). In certain embodiments, the second reservoir and third reservoir comprise random co-polymers. Still in other embodiments, the second reservoir and third reservoir comprise the same random co-polymers. In certain embodiments, the sealing material in the first reservoir comprises a solvent material the same as a solvent material into which a first co-polyimide in the second reservoir and into which a second co-polyimide in the third reservoir are dissolved. In some embodiments a random co-polymer is used in the second reservoir with a block co-polymer used in the third reservoir, or vice versa. In some embodiments, the microporous or mesoporous membrane support material includes a support material selected from the group consisting of: flat sheet support material; hollow fiber support material; and combinations thereof.

Some embodiments include a fourth reservoir with a cross-linking agent to crosslink the first co-polyimide solution and the second co-polyimide solution once disposed upon the microporous or mesoporous membrane support material. In some embodiments, the sealing material is selected from the group consisting of: chloroform (CHCl3); N,N-dimethylformamide (DMF); dichloromethane (DCM); N,N-dimethyl acetamide (DMAc); acetone; tetrahydrofuran (THF); N-methyl-2-pyrrolidone (NMP); tetra chloromethane (CCl4)); and combinations of the same. Still other embodiments include a fourth reservoir to apply a gutter layer to the microporous or mesoporous membrane support material.

Additionally disclosed is a multi-layer composite co-polyimide membrane including a microporous or mesoporous membrane support material; a sealing material for coating a sealing layer on the membrane support material to prevent penetration of co-polyimides into pores of the microporous or mesoporous membrane support material; a first permselective co-polyimide layer atop and in contact with the sealing layer; and a second permselective co-polyimide layer atop and in contact with the first permselective co-polyimide layer. In some embodiments, the first permselective co-polyimide layer and second permselective co-polyimide layer comprise block co-polymers. In certain other embodiments, the first permselective co-polyimide layer and second permselective co-polyimide layer comprise the same block co-polymers. Still in other embodiments, the first permselective co-polyimide layer and second permselective co-polyimide layer comprise block (6FDA-CARDO)/(6FDA-durene). Still in other embodiments, the first permselective co-polyimide layer and second permselective co-polyimide layer comprise random co-polymers. In some embodiments, the first permselective co-polyimide layer and second permselective co-polyimide layer comprise the same random co-polymers.

Still in other embodiments the first permselective co-polyimide layer comprises random co-polymers and the second permselective co-polyimide layer comprises block co-polymers or vice versa. In some embodiments, the first permselective co-polyimide layer and second permselective co-polyimide layer result in a thickness between about 1-3 μm. Still in other embodiments, the sealing layer comprises a solvent material being the same as a solvent material into which a first co-polyimide of the first permselective co-polyimide layer and into which a second co-polyimide of the second co-polyimide layer are dissolved for applying the first permselective co-polyimide layer and second permselective co-polyimide layer. Still in other embodiments, the microporous or mesoporous membrane support material for coating includes a support material selected from the group consisting of: flat sheet support material; hollow fiber support material; and combinations thereof. Still other embodiments include crosslinking between the first permselective co-polyimide layer and the second permselective co-polyimide layer.

In some embodiments of the membrane, the first permselective co-polyimide layer and second permselective co-polyimide layer comprise at least one moiety selected from the group consisting of: a 6FDA based moiety; a mPDA based moiety; a durene diamine based moiety; a PTCDA based moiety; a PMDA based moiety; a BAPT based moiety; a TBB based moiety; a FDA based moiety; an ODA based moiety; a CARDO based moiety; a 6FpDA based moiety; an ABL-21 based moiety; a 3,3'-dihydroxybenzidine based moiety; a 3,3'-(hexafluoroisopropylidene)dianiline based moiety; a DAM based moiety; a BTDA based moiety; and combinations of the same.

In some embodiments, the membrane further comprises a gutter layer. Still in other embodiments, the gutter layer comprises poly [1-(trimethylsilyl)-1-propyne] (PTMSP).

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of apparatus, systems, and methods for production and use of multi-layer composite co-polyimide membranes for sour gas feed separations from natural gas, as well as others, which will become apparent, may be understood in more detail, a more particular description of the embodiments of the present disclosure briefly summarized previously may be had by reference to the various embodiments, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
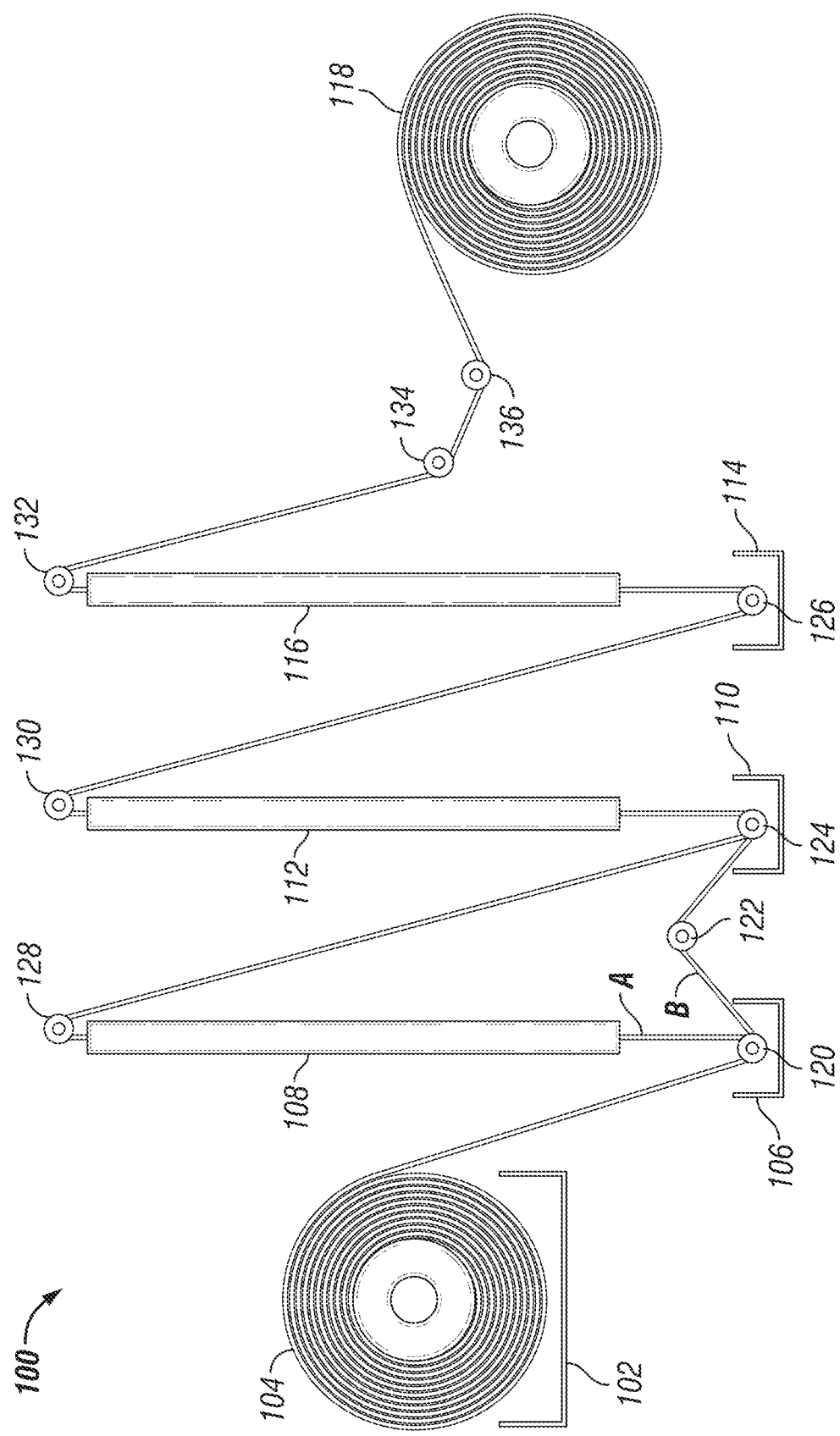
FIG. 1 is a schematic representation of a continuous coating process to fabricate multi-layer composite co-polyimide membranes.

Referring first to FIG. 1, embodiments here relate to methods for fabricating defect-free composite membranes and their use, particularly for gas and vapor separations including natural gas treatment. A consecutive coating process, as shown in FIG. 1, can include the steps of: (a) pre-wetting of a substrate using pure solvent to create an intermediate sealing pre-wetting layer, where the solvent can be used for application of polymer solution in one or more subsequent step (selective layers coating); (b) applying a gutter layer, where step (b) is optional; (c) deposition of a first permselective layer; (d) coating of second permselective layer directly on top of first permselective layer; and (e) immersion of the composite membrane formed from stages (a) to (d) in a cross-linking agent solution. In such a process, stages (a), (c), and (d) are generally required, and stages (b) and (e) are optional.

Figure 2:
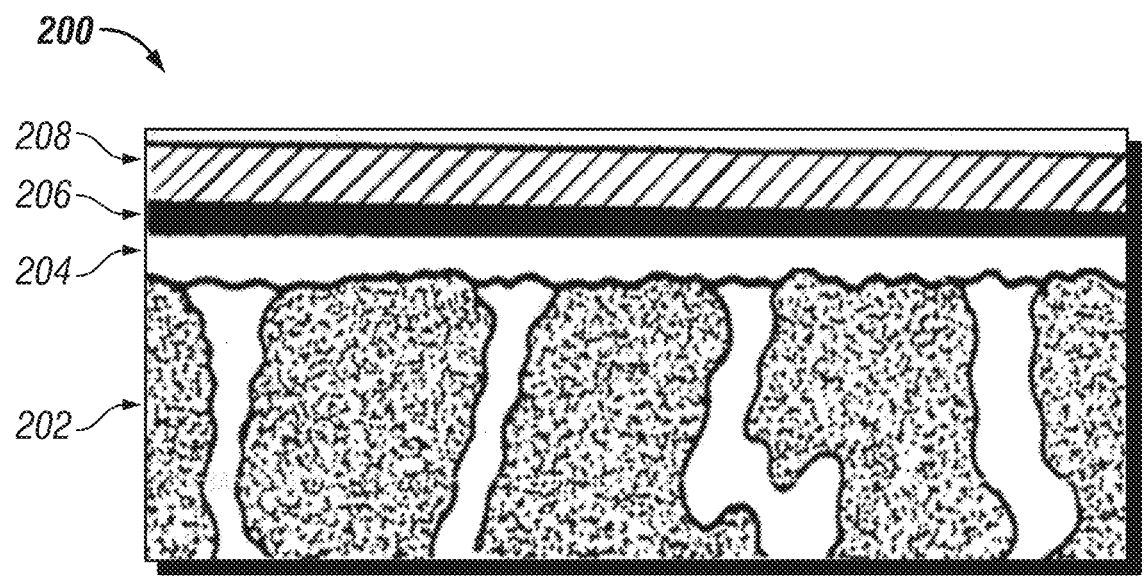
FIG. 2 is a schematic representation of a multi-layer composite co-polyimide separation membrane.

For example, in multi-layer composite co-polyimide continuous production apparatus 100, a first reservoir 102 contains a pure or substantially pure solvent to soak (or pre-wet) and coat microporous or mesoporous substrate 104 (forming an intermediate sealing pre-wetting layer 204 in FIG. 2). In a second reservoir 106, substrate 104 is coated with an optional gutter layer that can form a part of intermediate sealing pre-wetting layer 204, or be distinct from intermediate sealing pre-wetting layer 204. In one embodiment following a path "A," substrate 104 coated with an optional gutter layer is sent to a first dryer 108, before proceeding to a third reservoir 110. Third reservoir 110 contains the coating to apply a first permselective co-polyimide layer either atop and directly in contact with the substrate without the optional gutter layer (route "B") or atop and directly in contact with gutter layer (route "A"). The now coated substrate proceeds through a second dryer 112 and to a fourth reservoir 114 containing a second permselective co-polyimide layer in addition to or alternative to cross-linking agent. The substrate next passes through a third dryer 116 (optional in light of third reservoir 114 being optional), and ultimately onto a spool 118 as a thin film composite hollow fiber ("TFC HF") multi-layer composite co-polyimide membrane. Tension control rollers 120, 122, 124, 126, 128, 130, 132, 134, and 136 control the speed of and tension applied to substrate 104 as it proceeds through multi-layer composite co-polyimide continuous production apparatus 100 to ensure adequate thickness of coatings from the reservoirs 106, 110, and 114 and to ensure adequate drying time in dryers 108, 112, and 116. In other embodiments, more reservoirs can be used to apply additional coating layers, for example a separate additional reservoir for application of crosslinking material or a third permselective layer.

Reservoir 102 contains solvent to pre-wet (or soak) the substrate to prevent pore plugging by polymer solutions and create an intermediate sealing pre-wetting layer 204. The substrate optionally can be coated with a gutter layer in addition to or alternative to the intermediate sealing pre-wetting layer to minimize plugging by taking route "A" in FIG. 1. Gutter layer can be formed using poly [1-(trimethylsilyl)-1-propyne] PTMSP, for example. However, this gutter layer is optional. The substrate can be sent directly to reservoir 110 through route "B" to form a perm-selective layer using co-polyimide directly atop the intermediate sealing pre-wetting layer. The substrate can follow either route "A" or "B".

Reservoir 114 can contain either or both of crosslinking agent or a co-polyimide solution at a different concentration than reservoir 110. The co-polyimides in reservoirs 110, 114 can be the same co-polyimides at different concentrations or different co-polyimides at the same or different concentrations.

Drying temperature of the dryers 108, 112, 116 is generally 5-10° C. higher than the boiling point of solvent used in each solution in the reservoirs. Depending on chemical compatibility, other suitable substrates other than PAN include polyether ether ketone (PEEK), sulfonated polyether ether ketone (SPEEK), polysulfone (PSF), polyether sulfone (PESF), polyvinylidene fluoride (PVDF), polypropylene (PP), poly(tetrafluoroethylene) (PTFE), sulfonated poly(phthalazinone ether sulfone ketone) (SPPESK), poly(phthalazinone ether amide) (PPEA), polyether imide (PEI), Polyimide (PI) etc. Most of the substrates are commercially available.

Coating speed can vary from 10 m/min to 60 m/min. Coating speeds vary depending in part on the drying tower length. Gutter layer can be formed using PTMSP (about 0.1 to about 2.0 wt. % solution), and n-hexane in addition to or alternative to cyclohexane can be used for dissolving the PTMSP. PTMSP gutter layer (optional intermediate layer) thickness is generally in the about 0.2-1.0 micrometer range. Substrate thickness ranges from about 150 to 180 μm. First co-polyimide layer thickness ranges from about 0.2 to 1.0 μm and second co-polyimide layer thickness ranges from about 0.2 to 1.0 μm.

Different concentrations of co-polyimide solutions can be used for coating. About 2.0 to about 10 wt. % of co-polyimide can be dissolved in chloroform or in tetrahydrofuran (THF), for example. Optional crosslinking solution can be prepared by dissolving between about 0.2 to about 10 wt. % cross linking agent in water or organic solvents.

Two or more permselective layers can be fabricated on top of a porous substrate (flat sheet or hollow fiber) with precisely controlled membrane thicknesses. With methods applying systems similar to that shown in FIG. 1, intrusion of the coating solution(s) into the pores of substrate, which leads to dramatic decrease in selectivity and permeance, can be minimized. The resulting defect-free multi-layer composite membrane is particularly useful for sour gas feed separations from natural gas.

The membrane can ultimately include: (a) a microporous or mesoporous substrate; (b) an intermediate sealing pre-wetting layer; (c) a permselective layer; (d) a top permselective caulking layer; and (e) a crosslinking agent layer. The intermediate sealing pre-wetting layer is first deposited using a pure solvent directly onto a thicker porous non-selective support layer (reservoir 102). Then a gutter layer is applied, which is optional (reservoir 106). Then a first permselective layer (reservoir 110) is deposited from a solution directly onto the intermediate sealing pre-wetting layer coated on the porous support layer or onto the gutter layer. The intermediate sealing pre-wetting layer prevents penetration of the permselective layer reagents into the substrate pores during membrane preparation and provides a sealing layer in the finished membrane, thereby playing a critical role in decreasing the thickness of the selective layers. More or fewer layers may exist in the composite membranes. The optional gutter layer may form a separate layer or may comprise a portion of the intermediate sealing pre-wetting layer.

Examples of thin film sealing layers can include specific single or multi-component solvent systems, for example chloroform ($CHCl_3$); N,N-dimethylformamide (DMF); dichloromethane (DCM); N,N-dimethyl acetamide (DMAc); acetone; tetrahydrofuran (THF); N-Methyl-2-pyrrolidone (NMP); and/or tetra chloromethane ($CCl_4$)). The microporous or mesoporous support substrate can include polyacrylonitrile (PAN), for example. In one example, a thin film of block co-polyimide containing (6FDA-CARDO)/(6FDA-durene) (5000/5000) is coated onto the sealing layer already coated on a PAN support from a specific single or multi-component solvent system.

The next layer applied can be a thin film of the same block co-polyimide as used in the first permselective layer (or a difference block or random co-polyimide); and, the co-polyimide concentration in the solutions can be different in each of the layers (reservoirs 110, 114), or could be the same or about the same. The applied layer from reservoir 114 can be referred to as "the caulking layer" and can also be considered as a permselective layer coated on the first permselective layer to seal off any defect or pin-holes that may be present in the overall finished membrane. The optional fifth stage is application of a crosslinking agent solution (reservoir 114 or a separate reservoir, not pictured) in which the composite membrane formed from stages (a) to (d) is immersed. Crosslinking of the formed composite membrane can be achieved using different types and sizing of functional groups.

Examples include and are not limited to functionalization or grafting with polar or $H_2S$-philic, in addition to or alternative to $CO_2$-philic, groups that include Bromine (Br); sulfonate ($SO_3H$); diallyl amine; acrylonitrile; jeffamines; and combinations thereof. Crosslinking can also be achieved using such cross-linkers as N,N-dimethylpiperizine, p-xylenediamine, m-xylenediamine, aliphatic diamine, polyethyleneimine, and 1,3-cyclohexane-bis(methylamine) for example. Co-polyimide solutions (reservoirs 110, 114) are formed by dissolving an appropriate amount of a polymer (block or random) in suitable solvent or multi-component solvent system such as chloroform ($CHCl_3$); N,N-dimethylformamide (DMF); dichloromethane (DCM); N,N-dimethyl acetamide (DMAc); acetone; tetrahydrofuran (THF); N-Methyl-2-pyrrolidone (NMP); and/or tetra chloromethane ($CCl_4$), for example. An effective film thicknesses of less than 1 micron can be achieved, and membranes can be used effectively as flat sheet membranes, as well as hollow fiber membranes, and can be applied in a plate and frame, spiral wound module, or hollow-fiber module arrangement. Resulting membranes have high gas fluxes and selectivities, and can be used, for example, to study gas transport properties of pure and sour mixed gas streams comprising $H_2S$, $CO_2$, He, $CH_4$, $N_2$ and $C_2H_6$ through the thin films of the co-polyimide membrane.

Plate and frame membrane systems utilize membranes laid on top of a plate-like structure, which in turn is held together by a frame-like support. Flat sheet membranes are bolted together with a frame around the perimeter; similar to a heat exchanger or filter press. There are two types of plate and frame membrane configurations; dead-end and cross flow. In dead-end plate and frame systems, the feed solution flows perpendicular into the membrane, while cross flow systems are made so that the flow is tangential to the membrane wall.

Spiral-wound elements include membranes, feed spacers, permeate spacers, and a permeate tube. First, a membrane is laid out and folded in half with the membrane facing inward. The feed spacer is then put in between the folded membranes, forming a membrane sandwich. The purpose of the feed spacer is to provide space for gas to flow between the membrane surfaces, and to allow for uniform flow between the membrane leaves. Next, the permeate spacer is attached to the permeate tube, and the membrane sandwich prepared earlier is attached to the permeate spacer using glue. The next permeate layer is laid down and sealed with glue, and the whole process is repeated until all of the required permeate spacers have been attached to the membranes. The finished membrane layers then are wrapped around the tube creating the spiral shape.

Hollow fiber filtration utilizes thousands of long, porous filaments ranging from about 1-3.5 mm wide, that are disposed in place in a PVC shell. Each filament is narrow in diameter and flexible. Hollow fiber membranes feature a very high packing density because of the small strand diameter. Because of the flexibility of the strands, certain filter configurations are possible that cannot be achieved in other filtration configurations.

Referring now to FIG. 2, a schematic representation is shown of a multi-layer composite co-polyimide separation membrane. For example, FIG. 2 can represent a membrane formed by the process and system of FIG. 1. Multi-layer composite co-polyimide separation membrane 200 includes a microporous or mesoporous support layer 202, for example PAN 350 Ultrafiltration (UF) membrane. Membrane 200 further includes an intermediate sealing pre-wetting layer 204 disposed atop and in intimate contact with microporous or mesoporous support layer 202. Intermediate sealing pre-wetting layer 204 includes a specific single or multi-component solvent system, for example chloroform ($CHCl_3$); N,N-dimethylformamide (DMF); dichloromethane (DCM); N,N-dimethyl acetamide (DMAc); acetone; tetrahydrofuran (THF); N-Methyl-2-pyrrolidone (NMP); and/or tetra chloromethane ($CCl_4$). Intermediate sealing pre-wetting layer 204 can optionally include or be replaced by a gutter layer such as poly [1-(trimethylsilyl)-1-propyne] (PTMSP) (not pictured).

Membrane 200 further includes a permselective block co-polyimide layer (for example (6FDA-CARDO)/(6FDA-durene) (5000/5000) co-polyimide) 206 disposed atop and in intimate contact with intermediate sealing pre-wetting layer 204. Membrane 200 further includes a second permselective block co-polyimide layer (also referred to as a top caulking layer) (for example (6FDA-CARDO)/(6FDA-durene) (5000/5000) co-polyimide) 208 disposed atop and in intimate contact with permselective block co-polyimide layer (for example (6FDA-CARDO)/(6FDA-durene) (5000/5000) co-polyimide) 206. Optional crosslinking agent is embedded in the $3^{rd}$ and $4^{th}$ layers 206, 208, but doesn't necessarily form a separate distinct layer by itself. Layers 204, 206 may be the same or different block or random co-polyimides and can be applied with different concentrations in solution at different or similar thicknesses, or at similar concentrations in solution at similar or different thicknesses.

Polymers include random 6FDA-durene/CARDO and block (6FDA-durene)/(6FDA-CARDO). Other co-polyimides that can be used include random 6FDA-durene/6FpDA; block (6FDA-durene)/(6FDA-6FpDA); random 6FDA-CARDO/6FpDA; block (6FDA-CARDO)/(6FDA-6FpDA); random 6FDA-DAM/CARDO; block (6FDA-DAM)/(6FDA-CARDO); random 6FDA-DAM/6FpDA; block (6FDA-DAM)/(6FDA-6FpDA); random 6FDA-DAM/ABL-21; block (6FDA-DAM)/(6FDA-ABL-21) and combinations and mixtures thereof.

Figure 3A:
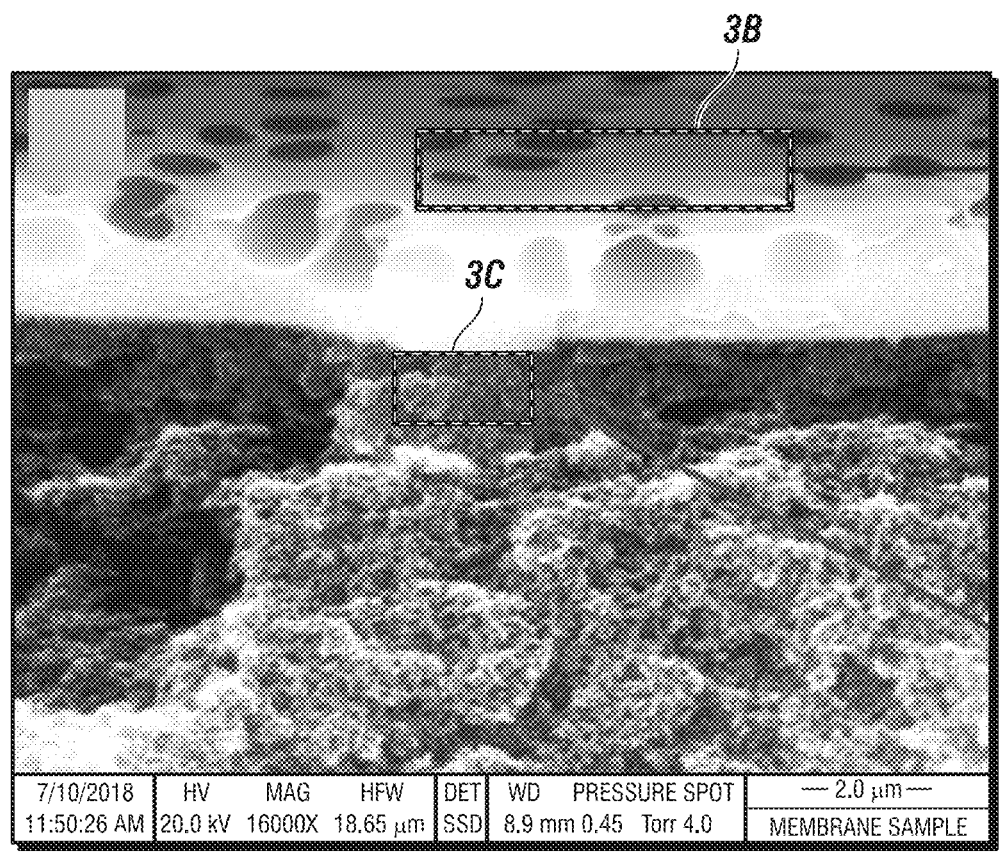
FIG. 3A is a scanning electron microscope (SEM) image of a cross-section of an interface between a substrate and a coating layer of a multi-layer composite thin film (6FDA-CARDO)/(6FDA-durene) (5000/5000) block co-polyimide membrane.

FIG. 3A is a scanning electron microscope (SEM) image of a cross-section of an interface between a substrate and a coating layer of a multi-layer composite thin film (6FDA-CARDO)/(6FDA-durene) (5000/5000) block co-polyimide membrane (for example an interface such as that between 202 and 204 in FIG. 2).

Figure 3B:
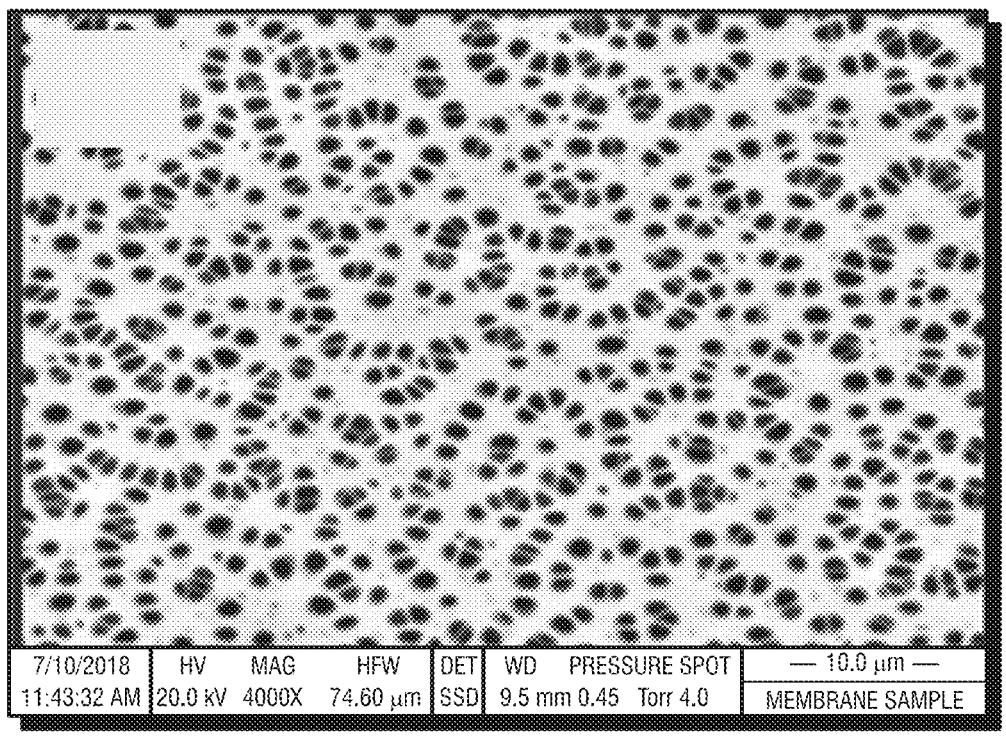
FIG. 3B is an enlarged SEM image of a surface of a coating layer of the composite, multi-layer thin film (6FDA-CARDO)/(6FDA-durene) (5000/5000) block co-polyimide membrane from FIG. 3A.

FIG. 3B is an enlarged SEM image of a surface of a coating layer of the multi-layer composite thin film (6FDA-CARDO)/(6FDA-durene) (5000/5000) block co-polyimide membrane from FIG. 3A (for example a surface such as 208 in FIG. 2).

Figure 3C:
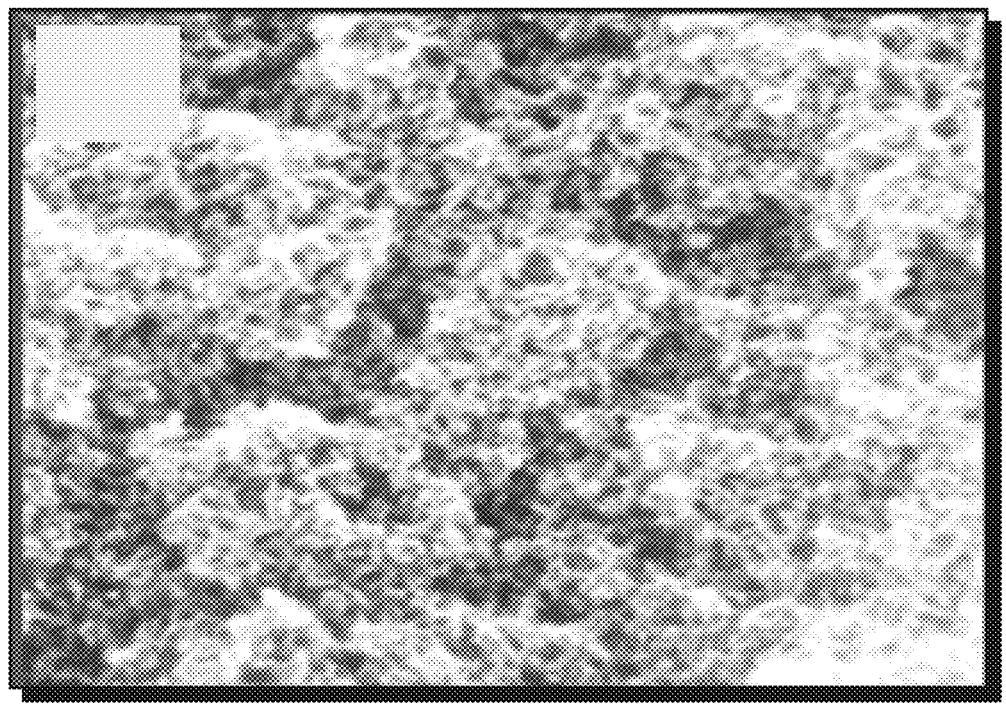
FIG. 3C is an enlarged SEM image of a cross-sectional view of the interface between the substrate and the coating layer of the multi-layer thin film (6FDA-CARDO)/(6FDA-durene) (5000/5000) block co-polyimide membrane of FIG. 3A.

FIG. 3C is an enlarged SEM image of a cross-sectional view of the interface between the substrate and the coating layer of the multi-layer thin film (6FDA-CARDO)/(6FDA-durene) (5000/5000) block co-polyimide membrane of FIG. 3A (for example an interface such as that between 202, 204, and 206 in FIG. 2). The interface appears intact and the perm-selective layer does not penetrate or bleed into the substrate.

Two parameters to assess intrinsic permeation and transport properties of membrane materials for gas separation are gas permeability, $P_i$, which is also known as the permeability coefficient and selectivity ($\alpha_{ij}$). These can be expressed as shown in Equation 1:

$$P_i = D_i S_i = \frac{j_i \cdot l}{p_{i(o)} - p_{i(l)}} \quad \text{Eq. 1}$$

($D_i S_i$) is referred to as membrane permeability of component i, ($P_i$), and it is a product of diffusion and solubility coefficients. The unit of permeability is Barrer, where 1 Barrer=$10^{-10}$ (cm$^3$(STP)·cm)/(cm$^2$·s·cmHg).

Ideal selectivity ($\alpha_{ij}$) can be expressed as the permeability ratio of two single gases, as depicted in Equation 2:

$$\alpha_{ij} = \frac{P_i}{P_j} \quad \text{Eq. 2}$$

Permeability coefficients of each gas species in the mixture, especially at low pressure, can be calculated from Equation 3 as follows:

$$P_i = \frac{x_{i(l)} J_i \cdot l}{(P_f x_{i(o)} - P_p x_{i(l)})} \quad \text{Eq. 3}$$

Permeance (Qi) is mostly used to evaluate membrane performance for composite membranes, and thus permeance can be expressed as Equation 4:

$$Q_i = \frac{P_i}{l} \quad \text{Eq. 4}$$

A widely used unit for gas permeance is GPU (gas permeation unit), which is given as 1 GPU=$10^{-6}$ (cm$^3$(STP))/(cm$^2$·s·cmHg).

The separation factor can be expressed as the ratio of the composition of the feed gas to the permeant gas, which is represented as Equation 5:

$$\alpha_{ij}^m = \frac{x_{i(l)}/x_{j(l)}}{x_{i(o)}/x_{j(o)}} \quad \text{Eq. 5}$$

For composite membranes, separation factor is usually used instead of selectivity, especially in mixed gas measurements. However for non-ideal gas mixtures, selectivity $\alpha_{ij}^{m,*}$ is used and is expressed as Equation 6:

$$\alpha_{ij}^{m,*} = \frac{P_i^*}{P_j^*} \quad \text{Eq. 6}$$

High gas permeance is obtained when a selective layer thickness is very thin (for example less than about 1.0 μm). Examples discussed here show development and fabrication of thin film composite membranes and investigation of their pure and sour mixed gas permeation properties for $H_2S$, $CO_2$, $N_2$, He, $CH_4$, and $C_2H_6$ mixed gas stream separations. An example block co-polyimide with (6FDA-CARDO)/(6FDA-durene) (5000/5000) backbone was employed in the selective layers. This was recently developed from co-polymerization of 6FDA-durene and 6FDA-CARDO) (U.S. Pat. Pub. No. 2018/0345229 A1). Embodiments tested here show enhancement in gas separation properties. Pure gases and mixed sour gases comprising $CO_2$, $CH_4$, $N_2$, $C_2H_6$, He, and $H_2S$ were passed through the thin films of multi-layer composite co-polyimide membranes with (6FDA-CARDO)/(6FDA-durene) (5000:5000) for simultaneous separation of $CO_2$, $N_2$, He, and $H_2S$ from sour natural gas streams.

Resulting membranes, for example optionally produced from the system and process of FIG. 1, have high gas fluxes and selectivities. Permeation properties of simulated sour gas mixtures comprising 10; 55; 10; 3; and 22 vol. % of $CO_2$, $CH_4$, $N_2$, $C_2H_6$, and $H_2S$, respectively, through the membrane were studied at different gas feed pressures up to 700 psig. The $CO_2/CH_4$ and $H_2S/CH_4$ selectivities obtained for the TFC membrane are 10 and 20, respectively; while $CO_2$ and $H_2S$ permeances are 78 and 149 GPU, respectively. These values and separation performances are surprising and unexpected. At high feed pressure (about 700 psig) and up to 22 vol. % $H_2S$ in a feed gas mixture, selectivities and permeances are still advantageous for separations in the membrane. Moreover, the $CO_2/CH_4$ selectivity of the co-polyimides does not degrade to anywhere near the same extent as was reported for cellulose acetate (CA), even under these much more aggressive environments. This stability at high pressures and high $H_2S$ concentration is impressive and unique.

EXAMPLES

The following Examples are given for the purpose of illustrating embodiments of the present invention, however, it is to be understood that these examples are merely illustrative in nature, and that the process embodiments are not necessarily limited thereto.

Example 1: Preparation of Multi-Layer Composite Block Co-Polyimide Membranes Series of multi-layer composite block co-polyimide membranes (being represented by FIG. 2 and Table 1) were fabricated as follows. Block co-polyimides were synthesized using 2,2'-bis-(3,4'-dicarboxyphenyl) hexafluoropropane dianhydride (6FDA) (Alfa Aesar); 2,3,5,6-tetramethyl-1,4-phenylenediamine (durene diamine) (Tokyo Chemical Industry); and 9,9-bis(4-aminophenyl)fluorene (CARDO) (Aldrich). The monomers were used as received without further purification, and as described in U.S. Pat. Pub. No. 2018/0345229 A1.

In some examples, poly(trimethylsilyl)propyne ("PTMSP" from Gelest Inc. USA) was used as received to form a gutter or sealing layer on top of mesoporous polyacrylonitrile ultrafiltration (UF) flat sheet membrane substrate (PAN350, molecular weight cut-off (MWCO)=20 kDa obtained from Sepro Membrane, USA). This PAN 350 was used as the support for the block co-polyimide composite membranes. Cyclohexane (99.5%, Sigma-Aldrich), chloroform (≥99.8%, Sigma-Aldrich), n-hexane (97%, Sigma-Aldrich), m-cresol (Alfa Aesar) and methanol (ThermoFisher Scientific) were used as solvents as received.

Two reference composite membranes were initially developed as follows:

Reference I composite membrane was developed using a spin coater (KW-4A, Chemat Technology). Coating procedures were performed by first cleaning the PAN 350 UF membrane and then placing it on a vacuum chuck (rotating disk) by taping the PAN 350 UF membrane on the disk to form a flat surface. The spin coater's speed was set to a speed of about 3,000 rpm, and 1 mL of a chloroform sealing layer solvent was then dripped dropwise onto the UF support for about 10 seconds of coating time.

The membrane was then placed in an oven to dry at about at 80° C. overnight. Then 4 wt. % of (6FDA-CARDO)/(6FDA-durene) (5000/5000) co-polyimide was dissolved in chloroform and filtered before use. The same spinning procedure was then followed to coat the co-polyimide selective layer on top of chloroform-solvent-sealed PAN support. The co-polyimide coated composite membrane was dried in an oven at 60° C. overnight. The membrane coating thickness was determined from gas flux measurements. The coating conditions were set to obtain about 1-3 µm thickness of the selective layer.

Reference II composite membrane was developed using a similar procedure as described in the Reference I composite membrane. The spin coater's speed was set to a speed of about 3,000 rpm, and 1 mL of chloroform sealing layer solvent was then dripped dropwise onto the UF support for about 10 seconds of coating time. The membrane was then placed in an oven to dry at about 80° C. overnight. Then 8 wt. % of (6FDA-CARDO)/(6FDA-durene) (5000/5000) co-polyimide was dissolved in chloroform and filtered before use. The same procedure was then followed to coat the co-polyimide selective layer on top of chloroform-solvent-sealed PAN support. The co-polyimide coated composite membrane was dried in oven at 60° C. overnight. The membrane coating thickness was determined from gas flux measurements. The coating conditions were set to obtain about 1-3 µm thickness of the selective layer.

Multi-Layer Composite Membrane I:

After the two Reference membranes, the composite membranes were developed using a spin coater (KW-4A, Chemat Technology). For multi-layer composite membrane I, a PTMSP gutter layer was first formed on a clean PAN 350 UF membrane using a spin coater. Coating procedures were performed by first cleaning a PAN 350 UF membrane and then placing it on a vacuum chuck (rotating disk) by taping the membrane on the disk to form a flat surface. The spin coater's speed was set to a speed of about 3,000 rpm, and 1 mL of PTMSP gutter layer solution (1.5 wt. % of PTMSP dissolved in cyclohexane) was then dripped dropwise onto the UF support for about 10 seconds of coating time.

The membrane support with gutter layer was then placed in an oven to dry at about at 80° C. overnight. Then 4 wt. % of (6FDA-CARDO)/(6FDA-durene) (5000/5000) co-polyimide was dissolved in chloroform and filtered before use. The same procedure was then followed to coat the co-polyimide selective layer on top of PTMSP guttered PAN support. The co-polyimide coated composite membrane was dried in oven at 60° C. overnight. The membrane coating thickness was determined from gas flux measurements. The coating conditions were set to obtain about 1-3 µm thickness of the selective layer.

Multi-Layer Composite Membrane II:

Two additional composite membranes were developed using a similar procedure as described for the multi-layer composite membrane I, but without the gutter material. However in these cases, the cleaned PAN 350 UF membrane was first pre-wet using the spin coater with the same solvent (chloroform) used to dissolve the co-polyimide. The pre-wetting procedures were performed by first cleaning PAN 350 UF membrane, and then it was placed on a vacuum chuck (rotating disk) by taping the membrane on a disk to form a flat surface. The spin coater's speed was set to a speed of about 3,000 rpm, and 1 mL of chloroform sealing layer solvent was then dripped dropwise onto the UF support for about 10 seconds of coating time.

The membrane was then placed in an oven to dry at about at 80° C. overnight. Then 8 wt. % of (6FDA-CARDO)/(6FDA-durene) (5000/5000) co-polyimide was dissolved in chloroform and filtered before use. The same procedure was then followed to coat the co-polyimide selective layer on top of chloroform-solvent-sealed PAN support. The co-polyimide coated thin layer composite membrane was dried in oven at 60° C. overnight. Then another 5 wt. % of (6FDA-CARDO)/(6FDA-durene) (5000/5000) co-polyimide was dissolved in chloroform and filtered before use. The same spin coating procedure was then followed to coat co-polyimide selective/caulking layer directly on top of the 8 wt. % of the co-polyimide membrane for intimate contact. The co-polyimide coated multi-layer composite membrane was then dried in oven at 60° C. overnight. The membrane coating thickness was determined from gas flux measurements. The coating conditions were set to obtain about 1-3 µm thickness of the selective layer overall.

The thickness refers to both co-polyimide layers together. An intermediate sealing pre-wetting layer (for example, volatile solvent chloroform) contributes near-zero thickness, as it is expected to dry out or evaporate once a membrane is dried. An optional gutter layer thickness ranges from about 0.2 to about 1.0 µm. Substrate thickness can range from about 150 to about 180 µm. First co-polyimide layer thickness ranges from about 0.2 to 1.0 µm, and second co-polyimide layer thickness ranges from about 0.2 to 1.0 µm.

Multi-Layer Composite Membrane III:

A third composite membrane was developed using a similar procedure as described for multi-layer composite membranes I and II. A cleaned PAN 350 UF membrane was first pre-wet using the spin coater with the same solvent (chloroform) later used to dissolve the co-polyimide. The pre-wetting procedures were performed by first cleaning the PAN 350 UF membrane and then placing it on a vacuum chuck (rotating disk) by taping the membrane on a disk to form a flat surface. The spin coater's speed was set to a speed of about 3,000 rpm, and 1 mL of chloroform sealing layer solvent was then dripped dropwise onto the UF support for about 10 seconds of coating time.

The membrane was then placed in an oven to dry at about at 80° C. overnight. Then 3 wt. % of (6FDA-CARDO)/(6FDA-durene) (5000/5000) co-polyimide was dissolved in chloroform and filtered before use. The same spinning procedure was then followed to coat the co-polyimide selective layer on top of chloroform-solvent-sealed PAN support. The co-polyimide coated thin layer composite membrane was dried in an oven at 60° C. overnight. Then another 5 wt. % of (6FDA-CARDO)/(6FDA-durene) (5000/5000) co-polyimide was dissolved in chloroform and filtered before use. The same procedure was then followed to coat the co-polyimide selective/caulking layer on top of the 3 wt. % of the initial co-polyimide membrane layer. The co-polyimide coated multi-layer composite membrane was then dried in oven at 60° C. overnight. The membrane coating thickness was determined from gas flux measurements. The coating conditions were set to obtain about 1-3 μm thickness of the selective layer.

The thickness refers to both co-polyimide layers together. An intermediate sealing pre-wetting layer (for example, volatile solvent chloroform) contributes near-zero thickness, as it is expected to dry out or evaporate once a membrane is dried. An optional gutter layer thickness ranges from about 0.2 to about 1.0 am. Substrate thickness can range from about 150 to about 180 am. First co-polyimide layer thickness ranges from about 0.2 to 1.0 am, and second co-polyimide layer thickness ranges from about 0.2 to 1.0 am.

TABLE 1

Pure gas permeances and ideal selectivity coefficients in produced membranes measured at 100 psig feed pressure and at 22° C., along with membrane production qualities.

| Membrane Samples | Pure gas permeance (GPU) | | | | Ideal selectivity | | |
|---|---|---|---|---|---|---|---|
| | He | $N_2$ | $CH_4$ | $CO_2$ | $He/CH_4$ | $CO_2/CH_4$ | $N_2/CH_4$ |
| Reference I: | 174 | 35.2 | 45.4 | 197 | 3.83 | 4.33 | 0.78 |
| Reference II: | 71.2 | 14.4 | 18.6 | 80.5 | 3.83 | 4.33 | 0.77 |
| Multi-layer composite membrane I: | 28.8 | 1.19 | 0.93 | 31.9 | 31.0 | 34.4 | 1.28 |
| Multi-layer composite membrane II: | 58.4 | 2.70 | 2.10 | 72.0 | 27.8 | 34.3 | 1.29 |
| Multi-layer composite membrane III: | 68.7 | 3.17 | 2.30 | 99.1 | 29.9 | 43.0 | 1.38 |
| Reference I | Pre-wetting with solvent → 4.0 wt. % polymer solution coating | | | | | | |
| Reference II | Pre-wetting with solvent → 8.0 wt. % polymer solution coating | | | | | | |
| Multi-layer composite membrane I | PTMSP gutter layer coating → 4.0 wt. % polymer coating | | | | | | |
| Multi-layer composite membrane II | Pre-wetting with solvent → 8.0 wt.% polymer solution coating → 5.0 wt. % polymer solution coating | | | | | | |
| Multi-layer composite membrane III | Pre-wetting with solvent → 3.0 wt.% polymer solution coating → 5.0 wt. % polymer solution coating | | | | | | |

The morphologies of the multi-layer composite membranes were characterized by scanning electron microscopy (FEI QANTA 400F E-SEM). The membranes were freeze-fractured in liquid nitrogen and observed at 20 kV after gold sputtering.

The pure gas permeation properties of the composite membranes were analyzed for He, $N_2$, $CH_4$, and $CO_2$ gases at a feed pressure of up to 100 psig using a constant pressure system. The sour gas mixture transport properties were also analyzed at 22° C. and at feed pressures of up to 700 psig using a sour gas mixture comprising 10, 55, 10, 3.0 and 22 vol. % of $CO_2$, $CH_4$, $N_2$, $C_2H_6$, and $H_2S$, respectively. For each experimental condition, three membranes were tested to ensure absence of any defect and to make sure measurements were reproducible. Any uncertainty on the measurements was generally less than +5% of the value shown.

As shown in Equations 1 and 3 supra, effective membrane thickness in composite or asymmetric membranes is important, however this property cannot be measured easily. Thus permeance, Qi as shown in Equation 4, is used to assess the permeation properties in TFC membranes rather than using permeability.

As depicted in FIGS. 3A-3C, a thin layer of co-polyimide selective layer was successfully coated on mesoporous PAN substrate. Approximately 2.0-2.5 μm of dense co-polyimide selective layer was observed. Even though this may look porous based on the cross-sectional image (FIG. 3A), the pores exist only up to half of the thickness of co-polyimide layer. Without being bound by any theory or practice, it is believed that the pores were formed, in part, as a result of the rapid solvent (chloroform) evaporation, which was used to dissolve the co-polyimide. Due to the dramatic increase of polymer concentration by fast evaporation of the solvent, the pores cannot be re-sealed. A first co-polyimide layer thickness ranges from about 0.2 to 1.0 μm and a second co-polyimide layer thickness ranges from about 0.2 to 1.0 μm. Pore sizes of substrate ranges between 2 nm and 50 nm for a mesoporous substrate and less than 2 nm for a microporous substrate. Optional gutter layer thickness ranges from about 0.2 to 1.0 μm.

Example 2: Evaluation of the $CO_2/CH_4$; $He/CH_4$; and $N_2/CH_4$ Pure Gas Separation Performance of the Multi-Layer Composite (6FDA-CARDO) (6FDA-Durene) (5000/5000) Multi-Layer Composite Co-Polyimide Membranes Prepared in Example 1

The single gas transport properties of all the three multi-layer composite membranes (I, II and III) are shown in Table 1. Multi-layer composite membrane I exhibits $CO_2/CH_4$ and $He/CH_4$ ideal selectivities of about 34.4 and 31.0, respectively, while composite membrane II shows $CO_2/CH_4$ and $He/CH_4$ ideal selectivities of about 34.3 and 27.8, respectively. $CO_2/CH_4$ and $He/CH_4$ ideal selectivities of about 43.0 and 29.9, respectively, are exhibited by composite membrane III. Thus, composite membrane III exhibits the highest permeances and ideal selectivities for all gases, when compared to the values obtained in composite membranes I and II. This can be attributed, in part, to the lower polymer concentration (3 wt. %) used in the first permselective layer of membrane III, which results in lower membrane thickness and thus higher gas permeance. In addition to this improved performance, a much smaller amount of polymer is required to fabricate it (membrane III), thus reducing cost.

Reference membranes I and II exhibit lesser selectivities for all gases with respect to methane. This is due to the membranes containing only 3 total layers (PAN, solvent, co-polyimide), which then results in membrane defects or pin holes, thereby rendering the membranes defective. This indicates that the second permselective layer is required to obtain defect-free composite membranes, as can be confirmed from the composite membranes (I, II & III), where much higher selectivities were obtained for all gases with respect to methane. Without being bound by any theory or practice, it is believed the $4^{th}$ layer or second perm-selective layer acts in part as a gutter layer to block the defects or pinholes that may have been created during fabrication of the membrane.

Different results obtained in the dense versus composite membranes could be attributed, in part, to the transport behavior of TFC membranes in which a thin selective layer usually behaves differently from those of self-supporting dense membranes. This may be attributed to the different polymer chain arrangements in TFC and dense films, which then results in different permeation properties and separation performances.

Example 3: Evaluation of the $CO_2/CH_4$ and $H_2S/CH_4$ Sour Mixed Gas Separation Performance of the Multi-Layer Composite Co-Polyimide (6FDA-CARDO) (6FDA-Durene) (5000/5000) Co-Polyimide Membranes Using Multi-Layer Composite Membrane II In order to assess the real performance of composite membrane II, especially under an aggressive $H_2S$ environment (for example, $H_2S$ concentration of up to 22 vol. %), sour gas mixture tests were conducted. Thus, the permeation properties of simulated sour gas mixtures comprising 10; 55; 10; 3; and 22 vol. % of $CO_2$, $CH_4$, $N_2$, $C_2H_6$, and $H_2S$ respectively, through the membrane were studied at different gas feed pressure of up to 700 psig, as shown in Table 2. The $CO_2/CH_4$ and $H_2S/CH_4$ selectivities obtained for the composite membrane are up to 10 and 20 respectively; while $CO_2$ and $H_2S$ permeances are 78 and 149 GPU respectively measured at the feed pressure of 500 psig.

The effect of feed pressure was also studied. At 22 vol. % $H_2S$, $CO_2$ permeance slightly increases (from 48 GPU to 78 GPU), whereas $H_2S$ permeance increases within the range of 58.6 to 149 GPU, as the pressure rises up to 700 psig (Table 2). $H_2S$ rises faster due to higher $H_2S$ condensability, where it competes with $CO_2$ for sorption sites. Since $H_2S$ has a better affinity for the sites, the sorption of $CO_2$ is presumably greatly reduced, leading to lower $CO_2$ permeance increase than $H_2S$.

As shown in Table 2, the $H_2S/CH_4$ selectivity remains substantially constant within the pressure range of up to 700 psig. However $CO_2/CH_4$ selectivity declines with increasing pressure of up to 700 psig. These values and separation performances exhibited by the composite are advantageous as compared to the values obtained in certain other high performance polymeric membranes. Importantly, at high feed pressures (up to about 700 psig) and up to 22 vol. % $H_2S$ in a feed gas mixture, selectivities and permeances are still impressive in the composite membrane. Moreover, the $CO_2/CH_4$ selectivity of the membrane does not degrade to anywhere near the same extent as was reported for cellulose acetate (CA), even under these much more aggressive environments. These separation performances displayed by the membranes are surprisingly and unexpectedly advantageous, exceeding performance exhibited by some prior art high performance membranes. The feed conditions of sour gas applied here were aggressive as to $H_2S$ concentration.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of compositions, systems, and methods for production and use of multi-layer composite co-polyimide membranes for sour gas feed separations from natural gas, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for producing a multi-layer composite co-polyimide membrane, the method comprising the steps of:
   preparing a microporous or mesoporous membrane support material for coating;
   applying a sealing layer to the membrane support material to prevent intrusion into the membrane support material of a co-polyimide polymer;
   applying a first permselective co-polyimide layer comprising the co-polyimide polymer, the co-polyimide polymer comprising block (6FDA-CARDO)/(6FDA-durene) atop and in contact with the sealing layer; and
   applying a second permselective co-polyimide layer comprising block (6FDA-CARDO)/(6FDA-durene) atop and in contact with the first permselective co-polyimide layer.

2. The method according to claim 1, where the first permselective co-polyimide layer and second permselective co-polyimide layer further comprise random co-polymers.

3. The method according to claim 2, where the first permselective co-polyimide layer and second permselective co-polyimide layer comprise the same random co-polymers.

4. The method according to claim 1, where the first permselective co-polyimide layer and second permselective co-polyimide layer result in a thickness between about 1-3 µm.

5. The method according to claim 1, where the sealing layer comprises a solvent material being the same as a solvent material into which a first co-polyimide of the first permselective co-polyimide layer and into which a second

TABLE 2

Sour mixed gas permeances and selectivity coefficients in the the multi-layer composite II (6FDA-CARDO)/(6FDA-durene) (5000/5000) co-polyimide membrane measured at 22° C. and using sour feed gas mixture containing 10; 55; 10; 3 and 22 vol.% of $CO_2$, $CH_4$, $N_2$, $C_2H_6$, and $H_2S$ respectively.

| $H_2S$ vol. % | $C_2H_6$ vol. % | Total feed pressure (psig) | Permeance (GPU) | | | | | Selectivity | |
|---|---|---|---|---|---|---|---|---|---|
| | | | $N_2$ | $CH_4$ | $C_2H_6$ | $CO_2$ | $H_2S$ | $CO_2/CH_4$ | $H_2S/CH_4$ |
| 22.0 | 1.0 | 200 | 4.96 | 3.03 | 3.24 | 48.0 | 58.6 | 15.8 | 19.3 |
| | | 400 | 4.25 | 5.36 | 7.45 | 62.0 | 111 | 11.6 | 20.6 |
| | | 500 | 3.80 | 7.75 | 11.8 | 78.1 | 149 | 10.1 | 19.2 |
| | | 700 | 4.14 | 8.61 | 12.9 | 76.2 | 147 | 8.84 | 17.1 | co-polyimide of the second permselective co-polyimide layer are dissolved for the steps of applying the first permselective co-polyimide layer and second permselective co-polyimide layer.

6. The method according to claim 1, where the sealing layer further comprises a gutter layer.

7. The method according to claim 6, where the gutter layer comprises poly [1-(trimethylsilyl)-1-propyne] (PTMSP).

8. The method according to claim 1, where the microporous or mesoporous membrane support material for coating includes a support material selected from the group consisting of: flat sheet support material; hollow fiber support material; and combinations thereof.

9. The method according to claim 1, further comprising a step of crosslinking the first permselective co-polyimide layer and the second permselective co-polyimide layer.

10. The method according to claim 1, where the sealing layer comprises a component selected from the group consisting of: Chloroform ($CHCl_3$); N,N-dimethylformamide (DMF); dichloromethane (DCM); N,N-dimethyl acetamide (DMAc); Acetone; Tetrahydrofuran (THF); N-Methyl-2-pyrrolidone (NMP); tetra chloromethane ($CCl_4$)); and combinations of the same.

11. The method according to claim 1, where a step of drying is carried out after each of the steps of applying the sealing layer, applying the first permselective co-polyimide layer, and applying the second permselective co-polyimide layer.

12. The method according to claim 1, further comprising a step of formulating a first co-polyimide for the first permselective co-polyimide layer and a step of formulating a second co-polyimide for the second permselective co-polyimide layer, where the steps of formulating comprise combining more than one monomer in a mixture of monomers, where the more than one monomer is selected from the group consisting of: 2,2'-bis-(3,4-dicarboxyphenyl)hexafluoropropane dianhydride (6FDA); 1,3-phenylenediamine (mPDA); durene diamine; 3,4,9,10-perylentetracarbonsauredianhydrid (PTCDA); pyromellitic dianhydride (PMDA); 1,4-bis(4-aminophenoxy)triptycene (BAPT); 4,5, 6,7-Tetrabromo-2-azabenzimidazole (TBB); 4,4'-(9-Fluorenylidene)dianiline (FDA); and 4,4'-Oxydiphthalic anhydride (ODA).

13. The method according to claim 1, where the first permselective co-polyimide layer or second permselective co-polyimide layer further comprises a polymer unit selected from the group consisting of: (6FDA-mPDA)/(6FDA-durene); (6FDA-PTCDA-FDA); (6FDA-TBB-FDA); (6FDA-B APT-FDA); (PTCDA-FDA)/(PMDA-mPDA); (PMDA-FDA)/(PTCDA-mPDA); (ODA-FDA)/(PTCDA-mPDA); (6FDA-BAPT)/(6FDA-FDA); (PTCDA-mPDA)/(6FDA-FDA); (PTCDA-FDA)/(ODA-mPDA); (PTCDA-FDA)/(6FDA-FDA); (6FDA-TBB)/(6FDA-FDA); (6FDA-TBB)/(6FDA-durene); (6FDA-mPDA)/(6FDA-B APT); (PTCDA-mPDA)/(6FDA-FDA); (6FDA-mPDA-BAPT); and (6FDA-FDA-mPDA).

14. The method according to claim 1, further comprising a step of formulating a first co-polyimide for the first permselective co-polyimide layer and a step of formulating a second co-polyimide for the second permselective co-polyimide layer, where the steps of formulating comprise combining at least three distinct moieties polymerized together, the moieties including a 2,2'-bis(3,4-dicarboxyphenyl)hexafluoropropane dianhydride (6FDA) based moiety; a 9,9-bis(4-aminophenyl) fluorene (CARDO) based moiety; and 2,3,5,6-tetramethyl-1,4-phenylenediamine (durene diamine) based moiety.

15. The method according to claim 1, further comprising a step of formulating a first co-polyimide for the first permselective co-polyimide layer and a step of formulating a second co-polyimide for the second permselective co-polyimide layer, where the steps of formulating comprise combining at least three distinct moieties polymerized together, the three distinct moieties including a first moiety, a second moiety, and a third moiety;
  wherein the first moiety comprises a 2,2'-bis(3,4-dicarboxyphenyl)hexafluoropropane dianhydride (6FDA) based moiety;
  the second moiety comprises a 4,4'-(hexafluoroisopropylidene)dianiline (6FpDA) based moiety; and
  the third moiety comprises a component selected from the group consisting of: a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

16. The method according to claim 1, further comprising a step of formulating a first co-polyimide for the first permselective co-polyimide layer and a step of formulating a second co-polyimide for the second permselective co-polyimide layer, where the steps of formulating comprise combining at least three distinct moieties polymerized together, the three distinct moieties including a first moiety, a second moiety, and a third moiety;
  wherein the first moiety comprises a 2,2'-bis(3,4-dicarboxyphenyl)hexafluoropropane dianhydride (6FDA) based moiety;
  the second moiety comprises a 2,4,6-trimethyl-m-phenylenediamine (DAM) based moiety; and
  the third moiety comprises a component selected from the group consisting of: a 4,4'-(hexafluoroisopropylidene)dianiline (6FpDA) based moiety; a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene) dianiline based moiety.

17. The method according to claim 1, where the first permselective layer or second permselective layer comprises a 2,2'-bis(3,4-dicarboxyphenyl)hexafluoropropane dianhydride (6FDA) based moiety and a 2,2'-bis(trifluoromethyl) benzidine (ABL-21) based moiety.

18. The method according to claim 1, further comprising the step of formulating a first co-polyimide for the first permselective co-polyimide layer and formulating a second co-polyimide for the second permselective co-polyimide layer, where the steps of formulating comprise combining at least three distinct moieties polymerized together, the three distinct moieties including a first moiety, a second moiety, and a third moiety;
  wherein the first moiety comprises a dianhydride selected from the group consisting of: a 2,2'-bis(3,4-dicarboxyphenyl)hexafluoropropane dianhydride (6FDA) based moiety; a benzophenone-3,3', 4,4'-tetracarboxylic dianhydride (BTDA) based moiety; and a pyromellitic dianhydride (PMDA) based moiety;
  wherein the second moiety comprises a 2,4,6-trimethyl-m-phenylenediamine (DAM) based moiety; and
  wherein the third moiety comprises a component selected from the group consisting of: a 4,4'-(hexafluoroisopropylidene)dianiline (6FpDA) based moiety; a 9,9-bis(4-aminophenyl) fluorene (CARDO) based moiety; a 2,3, 5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

19. A method of gas separation, the method comprising the step of:
   applying the multi-layer composite co-polyimide membrane of claim 1 to separate at least 2 components of a mixed gas stream.

20. The method according to claim 19, where feed pressure of the mixed gas stream to a feed side of the membrane is up to about 900 psig and $H_2S$ content of the mixed gas stream is up to about 22 volume percent.

* * * * *